US010754448B2

(12) United States Patent
Chiu et al.

(10) Patent No.: US 10,754,448 B2
(45) Date of Patent: Aug. 25, 2020

(54) ELECTRONIC STYLUS

(71) Applicant: Wacom Co., Ltd., Saitama (JP)

(72) Inventors: Kuan-her Chiu, Hsinchu (TW); Ming-shen Sun, Hsinchu (TW); Shinya Aoki, Saitama (JP); Hideyuki Hara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 102 days.

(21) Appl. No.: 15/985,058

(22) Filed: May 21, 2018

(65) Prior Publication Data

US 2018/0267636 A1    Sep. 20, 2018

Related U.S. Application Data

(63) Continuation of application No. PCT/JP2016/084453, filed on Nov. 21, 2016.

(30) Foreign Application Priority Data

Dec. 21, 2015  (JP) .................................. 2015-248446

(51) Int. Cl.
G06F 3/0354     (2013.01)
G06F 1/16       (2006.01)
G06F 3/041      (2006.01)
G06F 3/044      (2006.01)
G06F 3/046      (2006.01)

(52) U.S. Cl.
CPC ........ *G06F 3/03545* (2013.01); *G06F 1/1643* (2013.01); *G06F 3/0414* (2013.01); *G06F 3/044* (2013.01); *G06F 3/046* (2013.01)

(58) Field of Classification Search
CPC .... G06F 3/03545; G06F 3/0414; G06F 3/044; G06F 3/046; G06F 1/1643
See application file for complete search history.

(56) References Cited

U.S. PATENT DOCUMENTS

| 8,773,405 B1* | 7/2014 | Ryshtun | G06F 3/03545 |
| | | | 178/19.03 |
| 2012/0256830 A1* | 10/2012 | Oda | G06F 3/03545 |
| | | | 345/157 |
| 2017/0177099 A1 | 6/2017 | Tamura | |

FOREIGN PATENT DOCUMENTS

| JP | 6-119101 A | 4/1994 |
| JP | 7-44304 A | 2/1995 |
| JP | 7-295722 A | 11/1995 |
| JP | 5723499 B1 | 5/2015 |

* cited by examiner

*Primary Examiner* — Sahlu Okebato
(74) *Attorney, Agent, or Firm* — Seed IP Law Group LLP

(57) ABSTRACT

An electronic stylus includes a hollow cylindrical casing having an opening defined in an axial end portion thereof, a core body mounted in the casing and having an axial end portion projecting out of the opening, and a core body protector covering and accommodating therein the axial end portion of the core body, and protecting the core body. The casing has, adjacent to the opening, an abutment surface lying in a direction transverse to an axial direction of the casing and an inner wall surface extending in the axial direction of the casing. The core body protector has a first surface facing the abutment surface of the casing and a second surface facing the inner wall surface of the casing.

11 Claims, 8 Drawing Sheets

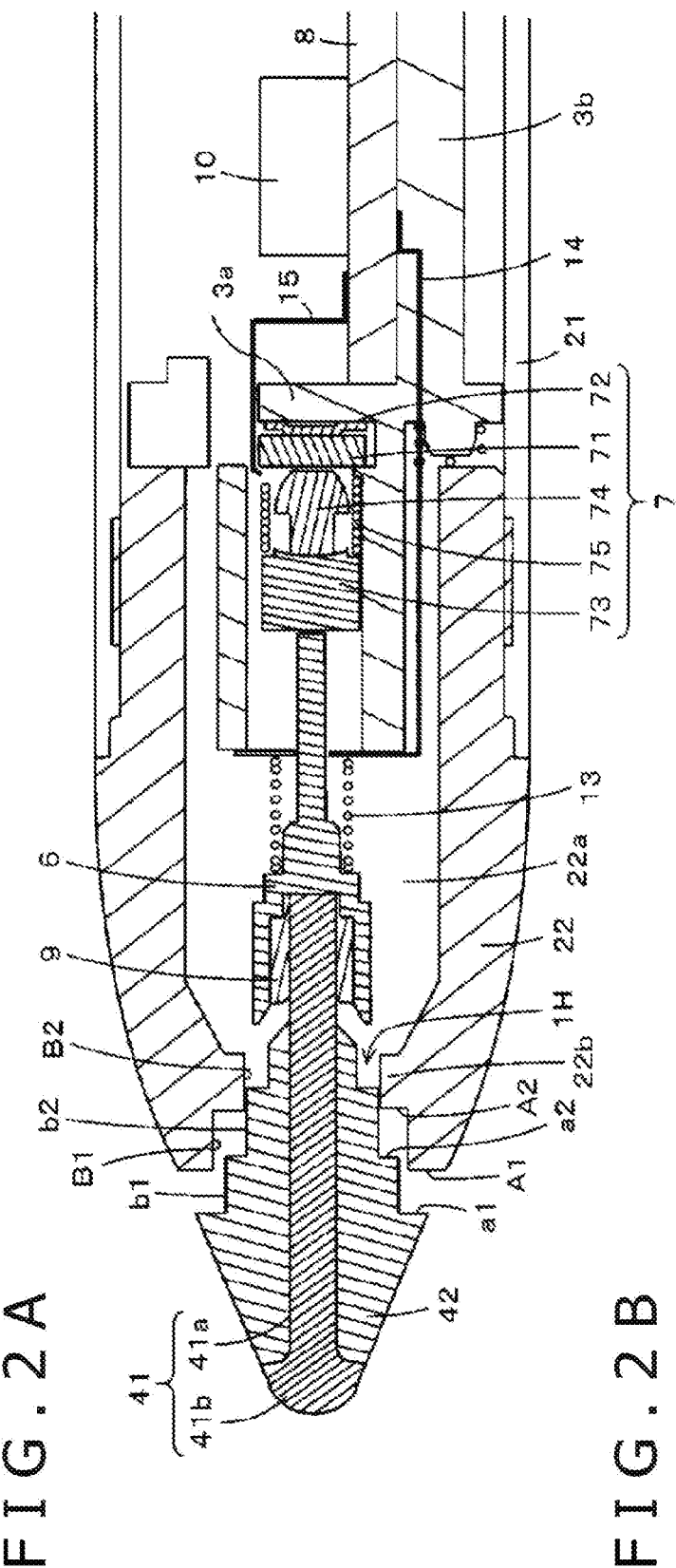
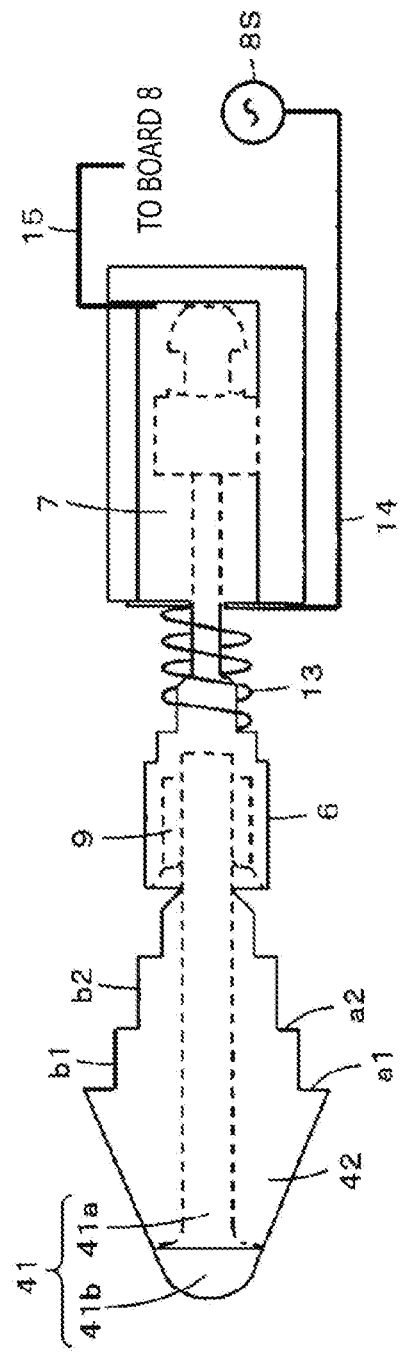
FIG. 2A
FIG. 2B

LOAD IN AXIAL DIRECTION

LOAD IN DIRECTION TRANSVERSE TO AXIAL DIRECTION

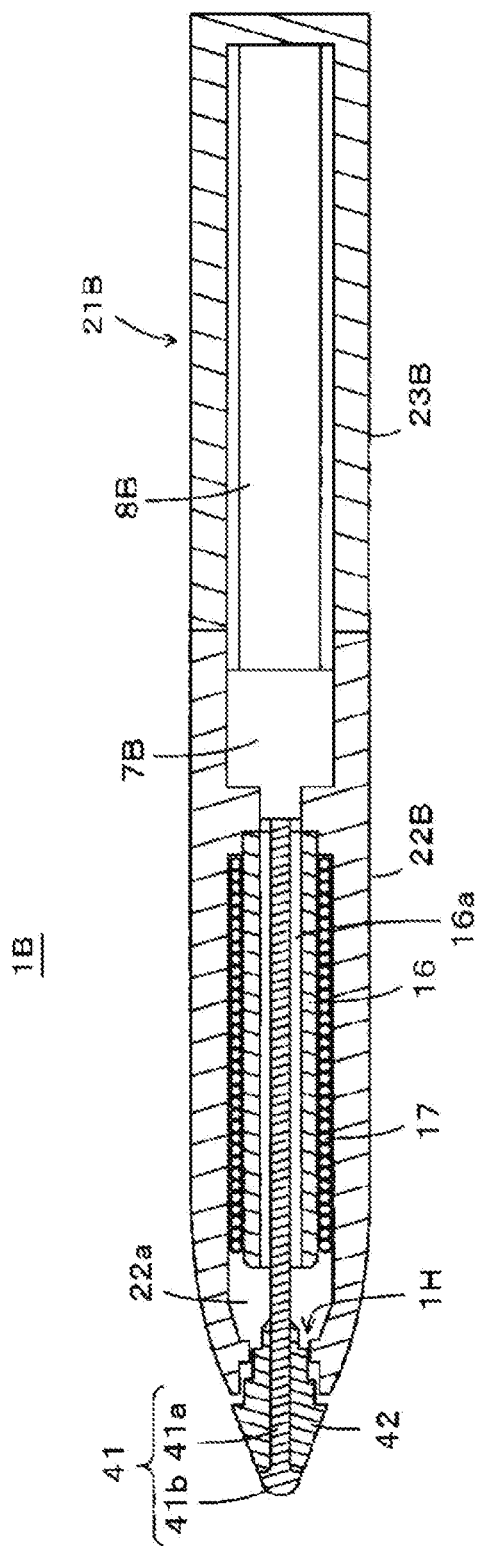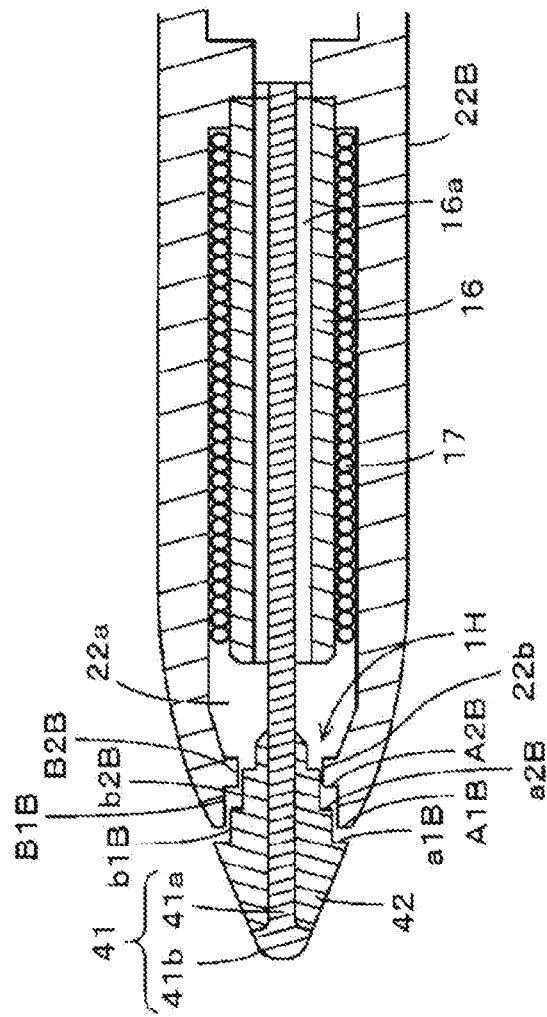

ELECTRONIC STYLUS

BACKGROUND OF THE INVENTION

Technical Field

The present invention relates to an electronic stylus that carries out a function as a position indicator for a position detecting device of the capacitive coupling type or the electromagnetic induction type.

Description of the Related Art

Many high-functionality telephone terminals called smartphones and information terminals called tablet PCs (Personal Computers) incorporate a touch panel as an input device. The touch panel is an electronic component including a combination of a display device such as a liquid crystal display and a position input device such as a coordinate detecting sensor, and makes it possible for the user to enter various control inputs when touched by a finger or fingers of the user. When it is necessary to enter detailed control inputs as for choosing finely displayed items on display or plotting and entering drawings, the user often uses an electronic stylus as a dedicated position indicator. Coordinate detecting sensors (position detecting sensors) for use in touch panels are of the electromagnetic induction type or the capacitance type, and electronic styluses that are compatible with those coordinate detecting sensors of the different types are used in combination therewith.

One example of coordinate detecting sensor of the electromagnetic induction type is disclosed in Japanese Patent Laid-open No. 1995-044304, and one example of coordinate detecting sensor of the capacitance type is disclosed in Japanese Patent Laid-open No. 1995-295722. Not only touch panels, but also coordinate input devices such as digitizers that employ coordinate detecting sensors of the electromagnetic induction type and the capacitive coupling type and which are not equipped with a display device have also heretofore been used as input devices for entering instructions and data into information processing apparatus such as personal computers. Dedicated electronic styluses are used in many cases for entering control inputs into such coordinate input devices.

An electronic stylus includes a rod-shaped core body mounted in a tubular casing. The core body has a tip end projecting from an end of the casing. Regardless whether the electronic stylus is used with a position detecting device of the electromagnetic induction type or the capacitive coupling type, the core body itself needs to be electrically conductive if signals are transmitted through the core body. To prevent the core body from damaging a contact surface of the touch panel and also to make the core body electrically conductive, the core body is made of a synthetic resin mixed with an electrically conductive material such as metal powder, carbon, or the like.

However, the core body that is made of a synthetic resin mixed with an electrically conductive material such as metal powder, carbon, or the like tends to be slightly hard and susceptible to shocks. Since the user uses the electronic stylus by holding it by hand, the user may inadvertently let it slip through their fingers, and the electronic stylus may possibly drop onto the floor. If the electronic stylus drops, with its stylus tip pointing down, head-on onto the floor, then the core body is subjected to an excessive axial load or impact, which is likely to deform or break the core body with higher, though slight, possibility. If the electronic stylus drops, with its stylus tip pointing down, obliquely onto the floor, then the core body is subjected to an excessive lateral load or impact transverse to its axis, which is likely to break the core body with higher, though slight, possibility.

One type of electronic stylus has a structure in which when the core body projecting from the casing is pushed back into the casing under a stylus pressure applied to the tip end of the core body, the core body presses a stylus pressure detector fixedly mounted in the casing, causing the stylus pressure detector to detect the applied stylus pressure. The electronic stylus transmits a signal representing the detected stylus pressure through the core body to a coordinate detecting sensor. In response to the received signal, the coordinate detecting sensor detects a position indicated by the electronic stylus depending on the position where the coordinate detecting sensor has received the signal from the electronic stylus, and also detects the stylus pressure, thereby making it possible to enter the user's handwriting depending on the stylus pressure through the touch panel.

The core body of the electronic stylus that is provided with the stylus pressure detector is of such a length that the core body is able to transmit the stylus pressure applied thereto appropriately to the stylus pressure detector and also does not excessively press the stylus pressure detector. However, if the user has dropped the electronic stylus, with the stylus tip pointing down, onto the floor, then an excessive axial load is instantly applied to the core body, possibly pushing the core body unnecessarily into the casing and applying an excessive load to the stylus pressure detector. Since the core body and the stylus pressure detector would be damaged in such a case, the core body and the stylus pressure detector have to be appropriately protected.

BRIEF SUMMARY OF THE INVENTION

It is an object of the present disclosure to provide an electronic stylus in which internal parts or mechanisms including a core body and a stylus pressure detector are appropriately protected from an excessive axial load and an excessive lateral load transverse to the core body, which are applied to the core body.

In order to achieve the above object, there is provided in accordance with the present disclosure an electronic stylus including a hollow cylindrical casing having an opening defined in an axial end portion thereof, a core body mounted in the casing and having an axial end portion projecting out of the opening, and a core body protector covering the axial end portion of the core body, and protecting the core body, in which the casing has, adjacent to the opening, an abutment surface lying in a direction transverse to an axial direction of the casing and an inner wall surface extending in the axial direction of the casing, and the core body protector has a first surface facing the abutment surface of the casing and a second surface facing the inner wall surface of the casing.

The core body is mounted in the casing with its axial end portion projecting out of the opening of the casing, and the core body protector covers and accommodates therein the axial end portion of the core body, thereby protecting the core body. The abutment surface, i.e., a surface which abuts against and stops another surface, of the casing which lies in the direction transverse to the axial direction of the casing and the first surface of the core body protector face each other. The inner wall surface of the casing which extends in the axial direction and the second surface of the core body protector also face each other.

When the abutment surface of the casing and the first surface of the core body protector abut against each other, the core body is prevented from being further pushed into the casing along the axial direction thereof. Likewise, when the inner wall surface of the casing and the second surface of the core body protector abut against each other, the core body is prevented from being further deformed or distorted in the direction transverse to the axial direction.

Consequently, even if an excessive axial load is applied to the core body, the core body is prevented from being unduly pushed into the casing, so that the core body and parts in the casing are protected against damage. In addition, even if an excessive load is applied to the core body in a direction transverse to the axial direction, the core body is prevented from being unduly deformed or broken in the direction transverse to the axial direction, so that the core body is protected against damage. Therefore, the core body protector that covers the core body reinforces the core body.

According to the present disclosure, the electronic stylus is able to protect internal parts or mechanisms including the core body and the stylus pressure detector from an excessive axial load and an excessive lateral load transverse to the core body, which are applied to the core body.

The above and other objects, features, and advantages of the present disclosure will become more apparent from the following description when taken in conjunction with the accompanying drawings.

BRIEF DESCRIPTION OF THE DRAWINGS

FIG. 2A is an enlarged fragmentary longitudinal cross-sectional view depicting internal structural details of a stylus tip assembly of the electronic stylus depicted in FIG. 1;

FIG. 2B is a schematic view depicting parts for detecting a stylus pressure and sending signals, of the electronic stylus depicted in FIG. 1;

FIG. 7A is a longitudinal cross-sectional view of an electronic stylus for use in combination with a coordinate detecting sensor of the electromagnetic induction transfer type;

FIG. 7B is an enlarged fragmentary longitudinal cross-sectional view of the electronic stylus depicted in FIG. 7A.

DETAILED DESCRIPTION

Electronic styluses according to embodiments of the present disclosure, for use as a position indicator with a position detecting device including a coordinate detecting sensor, will hereinafter be described below with reference to the drawings. FIGS. 1 through 4B depict an electronic stylus according to an embodiment of the present disclosure. The principles of the present disclosure are applicable to an electronic stylus for use with a coordinate detecting sensor of the capacitance type or an electronic stylus for use with a coordinate detecting sensor of the electromagnetic induction type.

For the sake of brevity, the present disclosure as applied to an electronic stylus for use with a coordinate detecting sensor of the capacitance type, the electronic stylus including an active electronic stylus that sends signals which are detected by the coordinate detecting sensor, will first be described below. The active electronic stylus is advantageous in that even though the stylus tip of the electronic stylus is slender in order to send signals from the stylus tip, the coordinate detecting sensor is able to detect an indicated position of the electronic stylus.

[Configurational Example of Active Electronic Stylus for Use with Coordinate Detecting Sensor of Capacitance Type]

Figure 1:
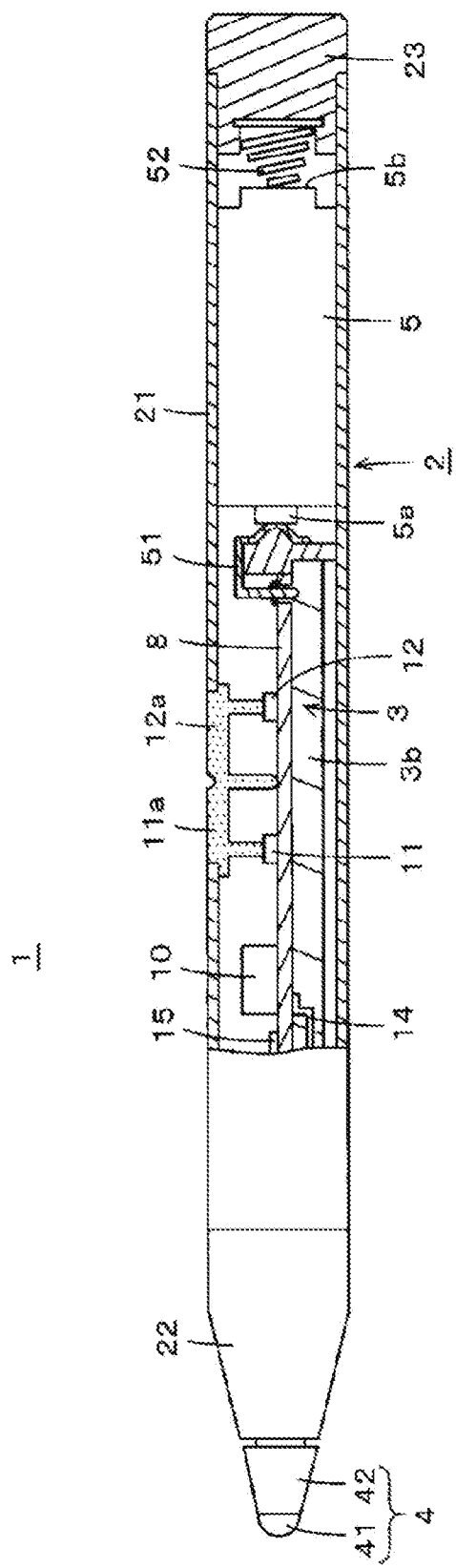
FIG. 1 is a side elevational view, partly in longitudinal cross section, of an electronic stylus according to an embodiment of the present disclosure.

FIG. 1 is a side elevational view, partly in longitudinal cross section, depicting an overall general structure of an electronic stylus 1 according to the present embodiment, the electronic stylus 1 having a case (casing) 2 illustrated as partly cut away to depict inner parts therein. FIG. 2A is an enlarged fragmentary longitudinal cross-sectional view depicting internal structural details of a stylus tip assembly of the electronic stylus 1. FIG. 2B is a schematic view depicting parts for detecting a stylus pressure and sending signals, of the electronic stylus 1.

As depicted in FIG. 1, the electronic stylus 1 is slender in axial directions thereof, i.e., in directions along a longitudinal central axis thereof, and has the case 2 that serves as a casing of hollow cylindrical shape and which has one axial end portion on a stylus tip side having an opening defined therein and the other axial end portion closed. The case 2 is made of an electrically conductive material, i.e., anodized aluminum in this embodiment. The case 2 includes a hollow cylindrical main case body 21 having a longitudinally elongate space therein, a front cap 22 coupled to the front end of the main case body 21, and a rear cap 23 coupled to the rear end of the main case body 21. The front cap 22 and the rear cap 23 are press-fitted respectively into the front and rear ends of the main case body 21, making up the case 2.

As depicted in FIG. 2A, the front cap 22 includes a tubular body having an axial through hole 22a defined therein and has a tapered outer profile whose outside diameter is progressively smaller toward the stylus tip on the stylus tip side of the electronic stylus 1. The front cap 22 has an end face on the stylus tip side which serves as an abutment surface A1 lying transversely to the axial directions, i.e., the longitudinal central axis, of the front cap 22. The abutment surface A1 includes a ring-shaped surface. The front cap 22 also has an inner wall surface B1 extending from the radially inner end of the abutment surface A1 in an axial direction of the front cap 22, i.e., parallel to the longitudinal central axis thereof. In other words, the inner wall surface B1 includes an inner circumferential surface of the tubular front cap 22.

The front cap 22 further includes an annular ridge 22b protruding radially inwardly from the inner wall surface B1 toward the longitudinal central axis of the front cap 22. The annular ridge 22b has an abutment surface A2 facing toward the stylus tip side and lying transversely to the longitudinal central axis of the front cap 22. Specifically, the abutment surface A2 includes a ring-shaped surface that is closer to the longitudinal central axis of the front cap 22 than the abutment surface A1 and which is axially offset toward the rear cap 23 from the abutment surface A1. The annular ridge 22b also has an inner wall surface B2 extending from the radially inner end of the abutment surface A2 in an axial direction of the front cap 22, i.e., parallel to the longitudinal central axis thereof. In other words, the inner wall surface B2 includes an inner circumferential surface of the tubular front cap 22, that is closer to the longitudinal central axis of the front cap 22 than the inner wall surface B1 and which is axially offset toward the rear cap 23 from the inner wall surface B1.

Therefore, as depicted in FIG. 2A, the front cap 22 of the electronic stylus 1 according to the present embodiment has the two abutment surfaces A1 and A2 disposed in different positions in the axial directions and the directions transverse to the axial directions. The front cap 22 also has therein the two inner wall surfaces B1 and B2 disposed in different positions in the axial directions and the directions transverse to the axial directions and surrounding the central axis of the case 2.

As depicted in FIGS. 1 and 2A, the electronic stylus 1 also includes a stylus tip assembly 4 on the stylus tip side of the front cap 22, the stylus tip assembly 4 including a core body 41 and a core body protector 42. The core body 41 is in the form of an electrically conductive rod-shaped body. Specifically, the core body 41 is made of a synthetic resin mixed with metal powder or carbon, and includes a rod-shaped main core member 41a and a semispherical tip end (stylus tip) 41b mounted on the tip of the main core member 41a. According to the present embodiment, the main core member 41a and the tip end 41b are integrally formed of the same material.

The core body protector 42 is made of an insulative material, e.g., ABS (Acrylonitrile Butadiene Styrene) resin. As depicted in FIG. 2A, the core body protector 42 protects the core body 41 by accommodating therein and covering the main core member 41a that projects from an opening 1H of the front cap 22. In the example depicted in FIG. 2A, the tip end 41b of the core body 41 and an end portion of the core body 41 that is opposite the tip end 41b are not covered with the core body protector 42.

As depicted in FIG. 2A, the core body protector 42 has a first surface a1 lying transversely to the longitudinal central axis thereof and facing the abutment surface A1 of the front cap 22 and a first surface a2 lying transversely to the longitudinal central axis thereof and facing the abutment surface A2 of the front cap 22. The core body protector 42 also has a second surface b1 lying parallel to the longitudinal central axis thereof and facing the inner wall surface B1 of the front cap 22 and a second surface b2 lying parallel to the longitudinal central axis thereof and facing the inner wall surface B2 of the front cap 22.

The stylus tip assembly 4 that includes the core body 41 and the core body protector 42 as described above is inserted through the opening 1H of the front cap 22 on the stylus tip side into the through hole 22a, placing the end portion of the core body 41 in the front cap 22.

The stylus tip assembly 4 has a tapered outer profile that smoothly blends into the tapered outer profile of the front cap 22. Specifically, as depicted in FIG. 2A, when the stylus tip assembly 4 is mounted on the case 2, the outer profiles of the stylus tip assembly 4 and the front cap 22 are essentially contiguous to each other steplessly, i.e., with no steps therebetween. The stylus tip assembly 4 and the front cap 22 that are put together are thus free of steps on their outer profiles. When the user carries the electronic stylus 1 by hand, therefore, the stylus tip assembly 4 and the front cap 22 neatly fit the fingertips of the user, allowing the user to use the electronic stylus 1 without feeling uncomfortable.

The case 2 houses a board holder 3 and a cell 5 in its internal space, as depicted in FIG. 1, and also houses a core body holder 6 and a pressure-sensitive assembly (stylus pressure detector) 7 in its internal space, as depicted in FIG. 2A.

As depicted in FIG. 2A, the board holder 3, which is made of an insulative synthetic resin, e.g., a liquid crystal polymer, includes a pressure-sensitive assembly holder 3a and a printed circuit board support base 3b that are contiguously arranged in the longitudinal directions, i.e., along the central axis, of the electronic stylus 1 at the time they are housed in the internal space of the case 2. The pressure-sensitive assembly holder 3a is of a hollow cylindrical shape housing in its internal space the pressure-sensitive assembly 7 that serves as a variable capacitor and includes a plurality of components for detecting a stylus pressure. The printed circuit board support base 3b is of a boat-like shape, i.e., a hollow substantially semicylindrical shape, for holding a printed circuit board 8 placed therein.

The board holder 3 is housed in the case 2 such that the pressure-sensitive assembly holder 3a is on the core body 41 side, i.e., near the core body 41. The core body holder 6 that holds the core body 41 is joined to the pressure-sensitive assembly holder 3a, so that a pressure (stylus pressure) applied to the core body 41 is transmitted to the pressure-sensitive assembly 7 housed in the pressure-sensitive assembly holder 3a.

The pressure-sensitive assembly holder 3a of the board holder 3 has an outside diameter smaller than the inside diameter of the through hole 22a in the front cap 22, allowing the pressure-sensitive assembly holder 3a to be housed in the through hole 22a in the front cap 22. The printed circuit board support base 3b of the board holder 3 is housed in the main case body 21 in a manner to push the pressure-sensitive assembly holder 3a toward the stylus tip side. The board holder 3 is positionally limited against movement toward the core body 41 along the central axis in the case 2.

As depicted in FIG. 1, a terminal conductor 51 is disposed on an end of the printed circuit board support base 3b of the board holder 3 which is opposite the pressure-sensitive assembly holder 3a. The terminal conductor 51 is held in electric contact with a positive terminal 5a of the cell 5 and is electrically connected to the copper foil pattern of a power supply line on the printed circuit board 8. A helical spring terminal 52 made of electrically conductive metal has one end held in electric contact with a negative terminal 5b of the cell 5 and the other end held against the rear cap 23 press-fitted in the rear end of the main case body 21.

The cell 5 is inserted into the case 2 such that the positive terminal 5a thereof is electrically connected to the terminal conductor 51 as depicted in FIG. 1. Thereafter, the rear cap 23 is press-fitted into the rear end of the main case body 21, causing the helical spring terminal 52 to press the negative terminal 5b of the cell 5.

According to the present embodiment, the main case body 21, which is made of an electrically conductive material, is electrically connected to a ground conductor on the printed circuit board 8. The rear cap 23 is also made of an electrically conductive material. Therefore, the negative terminal 5b of the cell 5 is electrically connected to the ground conductor on the printed circuit board 8 through the rear cap 23 and the main case body 21. The positive terminal 5a of the cell 5 is electrically connected to the copper foil pattern of the power supply line on the printed circuit board 8 through the terminal conductor 51. Therefore, the voltage of the cell 5 is supplied as a power supply voltage to circuits on the printed circuit board 8.

According to the present embodiment, the printed circuit board 8 supports thereon a circuit assembly including an IC (Integrated Circuit) 10 and peripheral circuit parts. The IC 10 includes a signal generating circuit 8S (see FIG. 2B) for generating signals to be sent from the core body 41 of the electronic stylus 1 and a control circuit for controlling the delivery of signals from the signal generating circuit 8S to the core body 41. The peripheral circuit parts include push switches (side switches) 11 and 12, etc. To the printed circuit board 8, there are connected a conductor terminal member 14 by which the core body 41 and the printed circuit board 8 are connected to each other and a conductor terminal member 15 for transmitting a detected stylus pressure output from the pressure-sensitive assembly 7.

According to the present embodiment, the core body 41 is joined to and held by the core body holder 6, which is made of an electrically conductive material, with the main core member 41a having a rear end portion fitted in the core body holder 6 through an electrically conductive elastic member 9. The core body holder 6 has a rear end fitted in a holding member 73, to be described later, of the pressure-sensitive assembly 7 in the pressure-sensitive assembly holder 3a, so that a stylus pressure applied to the core body 41 is transmitted to the pressure-sensitive assembly 7 through the core body holder 6. The core body holder 6 is normally biased to move toward the core body 41 with respect to the board holder 3 by a helical spring 13 that is disposed between the core body holder 6 and the board holder 3 as an example of resilient member made of an electrically conductive material such as electrically conductive metal or the like. The helical spring 13 and the conductor terminal member 14 make up an electric connector for transmitting signals from the IC 10 on the printed circuit board 8 to the core body 41. The rear end portion of the main core member 41a of the stylus tip assembly 4 is fitted in the core body holder 6 through the electrically conductive elastic member 9. However, the stylus tip assembly 4 can be pulled out of the core body holder 6, so that it can be replaced with a new stylus tip assembly 4.

As depicted in FIG. 2B, the helical spring 13 made of an electrically conductive material which is disposed between the core body holder 6 and the pressure-sensitive assembly holder 3a of the board holder 3 and the conductor terminal member 14, which extends in the printed circuit board support base 3b and is disposed on the pressure-sensitive assembly holder 3a, jointly make up an electric connector for transmitting signals from the signal generating circuit 8S included in the IC 10 on the printed circuit board 8 to the core body 41.

In the electronic stylus 1 according to the present embodiment, the pressure-sensitive assembly (stylus pressure detector) 7 incorporates a variable capacitor whose capacitance varies depending on the stylus pressure applied to the core body 41. As depicted in FIG. 2A, the pressure-sensitive assembly 7 includes a plurality of parts, i.e., a dielectric body 71, a terminal member 72, a holding member 73, an electrically conductive member 74, and a resilient member 75, which jointly make up a stylus pressure detecting module. The terminal member 72 is made of an electrically conductive material and serves as a first electrode of the variable capacitor incorporated in the pressure-sensitive assembly 7. The electrically conductive member 74 is made of electrically conductive rubber, for example, and the resilient member 75 includes a helical spring made of an electrically conductive material. The electrically conductive member 74 and the resilient member 75 are electrically connected to each other and serve as a second electrode of the variable capacitor incorporated in the pressure-sensitive assembly 7.

The capacitance of the variable capacitor provided between the terminal member 72 as the first electrode and the electrically conductive member 74 as the second electrode varies depending on the stylus pressure applied to the core body 41. The change in the capacitance of the variable capacitor is supplied from the pressure-sensitive assembly 7 through the conductor terminal member 15 to the IC 10 on the printed circuit board 8, whereupon the IC 10 detects the stylus pressure applied to the core body 41.

Specifically, as depicted in FIG. 2A, when the electronic stylus 1 is not in use, the abutment surfaces A1 and A2 of the front cap 22 and the first surfaces a1 and a2 of the core body protector 42 axially face each other with small gaps therebetween. Therefore, the stylus tip assembly 4, which is made up of the core body 41 and the core body protector 42, can move toward the front cap 22 when a stylus pressure is applied to the core body 41 by the user of the electronic stylus 1. When the stylus tip assembly 4 is moved toward the front cap 22 under the applied stylus pressure, the core body 41 and the core body holder 6 press the pressure-sensitive assembly 7 against the bias of the helical spring 13, whereupon the IC 10 detects the applied stylus pressure. When the stylus pressure applied to the core body 41 is removed, the stylus tip assembly 4 returns to the position depicted in FIG. 2A under the bias of the helical spring 13.

The IC 10 of the electronic stylus 1 sends a burst signal for coordinate detection (positional detection) to a coordinate detecting sensor. During a period in which the IC 10 on the printed circuit board 8 sends the burst signal, the IC 10 performs a process of detecting a stylus pressure on the basis of the capacitance of the variable capacitor. After the period in which the IC 10 sends the burst signal is finished, the IC 10 transmits an encoded signal representing the detected stylus pressure out of the electronic stylus 1 through the core body 41.

The electronic stylus 1 thus carries out a function to indicate its position on the coordinate detecting sensor to the coordinate detecting sensor and also to detect a stylus pressure applied to the core body 41 and send the detected stylus pressure to the coordinate detecting sensor.

As described above, the electronic stylus 1 incorporates therein a structure in which the abutment surfaces A1 and A2 of the front cap 22 and the first surfaces a1 and a2 of the core body protector 42 axially face each other with small gaps therebetween. This structure is effective to protect the core body 41, the pressure-sensitive assembly 7, etc. from excessive axial loads imposed on the core body 41. The electronic stylus 1 also incorporates therein a structure in which the inner wall surfaces B1 and B2 of the front cap 22 and the second surfaces b1 and b2 of the core body protector 42 radially face each other. This structure is effective to protect the core body 41 from excessive radial or lateral loads imposed on the core body 41.

Figure 3A:
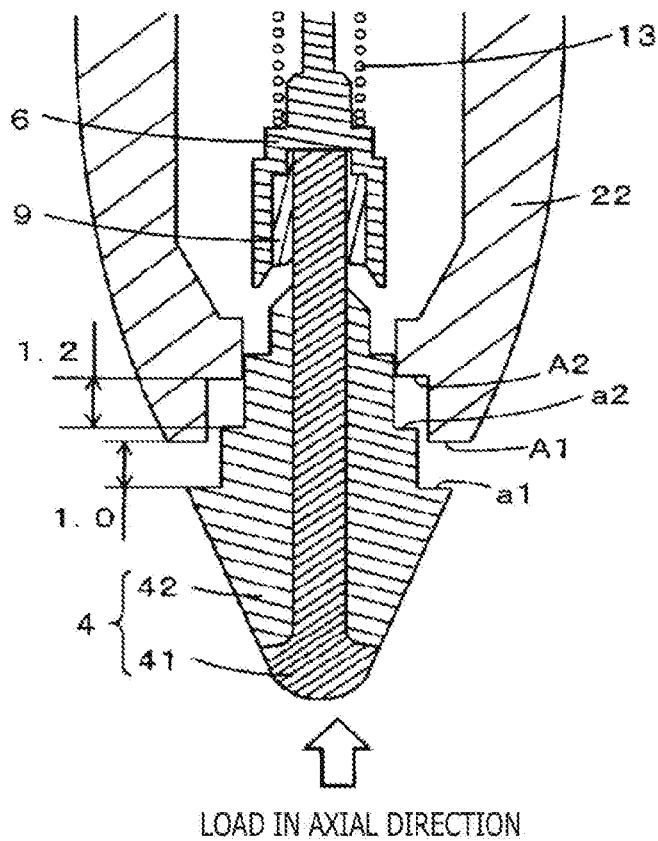
FIG. 3A is an enlarged fragmentary longitudinal cross-sectional view depicting a structure for protecting parts from an axial load, of the electronic stylus depicted in FIG. 1.
Figure 3B:
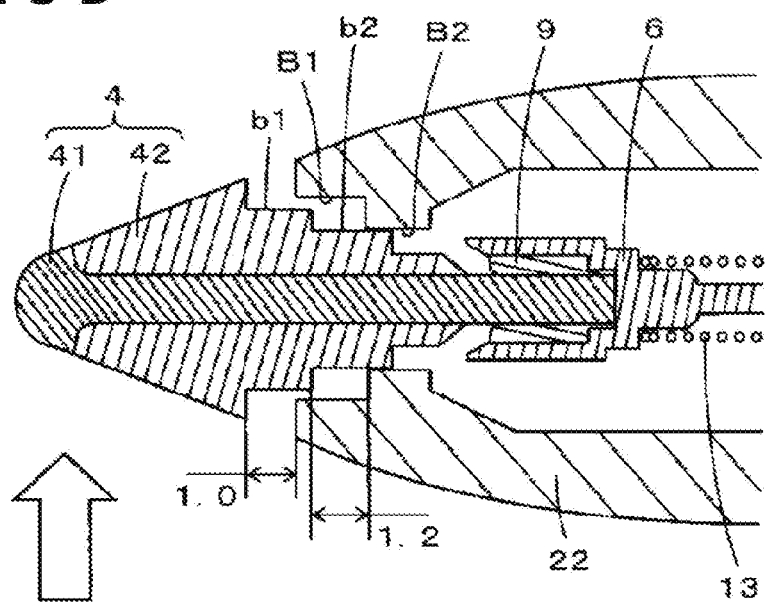
FIG. 3B is an enlarged fragmentary longitudinal cross-sectional view depicting a structure for protecting parts from a lateral load transverse to the axis, of the electronic stylus depicted in FIG. 1.

FIGS. 3A and 3B are enlarged fragmentary longitudinal cross-sectional views depicting a structure for protecting parts such as the core body 41, the pressure-sensitive assembly 7, etc. from excessive loads that are applied to the electronic stylus 1 according to the present embodiment. FIG. 3A depicts the structure at the time an excessive axial load is applied to the core body 41, and FIG. 3B depicts the structure at the time an excessive radial or lateral load transverse to the central axis is applied to the core body 41.

It is assumed that the user has dropped the electronic stylus 1, with the stylus tip assembly 4 pointing down, onto the floor. In this case, as indicated by an arrow mark in FIG. 3A, an excessive axial load or shock is applied to the core body 41. Under the applied excessive axial load, the stylus tip assembly 4 is moved upwardly toward the front cap 22 until the first surfaces a1 and a2 of the core body protector 42 are brought into abutment respectively against the abutment surfaces A1 and A2 of the front cap 22, whereupon the stylus tip assembly 4 is prevented from being further pushed into the case 2.

At this time, the core body protector 42 and the front cap 22 function to reduce the excessive axial load applied to the core body 41, protecting the parts pressed by the core body 41, i.e., the core body 41 itself, the pressure-sensitive assembly 7, etc. The core body 41 itself is prevented from being deformed or broken, and the parts pressed by the core body 41, i.e., the pressure-sensitive assembly 7, etc., are prevented from being damaged.

It is assumed that the user hits a desk or hard surface with the electronic stylus 1 held by hand. In this case, as indicated by an arrow mark in FIG. 3B, an excessive radial or lateral load or shock transverse to the central axis of the electronic stylus 1 is applied to the core body 41. Under the applied excessive radial load, the stylus tip assembly 4 is displaced radially until the second surfaces b1 and b2 of the core body protector 42 are brought into abutment respectively against the inner wall surfaces B1 and B2 of the front cap 22, whereupon the stylus tip assembly 4 is prevented from being further displaced, distorted, or bent in a direction transverse to the central axis of the electronic stylus 1.

At this time, the core body protector 42 and the front cap 22 function to reduce the excessive radial load applied to the core body 41, protecting the core body 41. The core body 41 is rod-shaped and most susceptible to excessive loads applied radially or transversely to the core body 41. The core body protector 42 and the front cap 22 are effective to protect the core body 41 from the excessive radial loads, and the core body 41 is prevented from being deformed or broken.

If the electronic stylus 1 drops, with its stylus tip assembly 4 pointing down, obliquely onto the floor, then the stylus tip assembly 4 may be subjected to excessive axial and radial loads or shocks. In this case, the abutment surfaces A1 and A2 of the front cap 22 abut respectively against the first surfaces a1 and a2 of the core body protector 42, and the inner wall surfaces B1 and B2 of the front cap 22 abut respectively against the second surfaces b1 and b2 of the core body protector 42, thereby appropriately protecting the core body 41 and other internal parts of the electronic stylus 1.

When the electronic stylus 1 is not in use as depicted in FIGS. 3A and 3B, the abutment surface A1 of the front cap 22 and the first surface a1 of the core body protector 42 are spaced from each other by a distance of 1.0 mm, and the abutment surface A2 of the front cap 22 and the first surface a2 of the core body protector 42 are spaced from each other by a distance of 1.2 mm. Therefore, an axial load applied to the core body 41 is absorbed when the abutment surface A1 of the front cap 22 and the first surface a1 of the core body protector 42 initially abut against each other.

When a larger load is applied to the core body 41, pushing the stylus tip assembly 4 toward the case 2, the abutment surface A2 of the front cap 22 and the first surface a2 of the core body protector 42 then abut against each other. Consequently, in addition to the abutment surface A1 of the front cap 22 and the first surface a1 of the core body protector 42, the abutment surface A2 of the front cap 22 and the first surface a2 of the core body protector 42 function, absorbing the larger load. Accordingly, the electronic stylus 1 can absorb axial loads applied to the core body 41 in two stages, thereby appropriately protecting the core body 41.

The abutment surfaces A1 and A2 of the front cap 22 and the first surfaces a1 and a2 of the core body protector 42 abut against each other before the pressure-sensitive assembly 7 reaches its detection limit point. Consequently, the pressure-sensitive assembly 7 and other parts in the electronic stylus 1 are protected from axial loads applied to the core body 41.

[Modifications of Stylus Tip Assembly 4]

As described above with reference to FIG. 2A, in the stylus tip assembly 4, the core body protector 42 covers the main core member 41a accommodated therein, and the tip end 41b of the core body 41 projects from the core body protector 42. The stylus tip assembly 4 thus constructed allows signals to be sent properly therethrough to the coordinate detecting sensor and is also able to appropriately protect the main core member 41a that is relatively vulnerable to external loads.

Figure 4A:
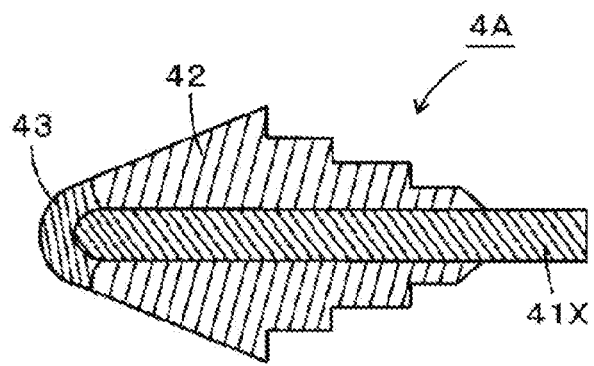
FIG. 4A is a longitudinal cross-sectional view of a stylus tip assembly according to a modification of the present disclosure.
Figure 4B:
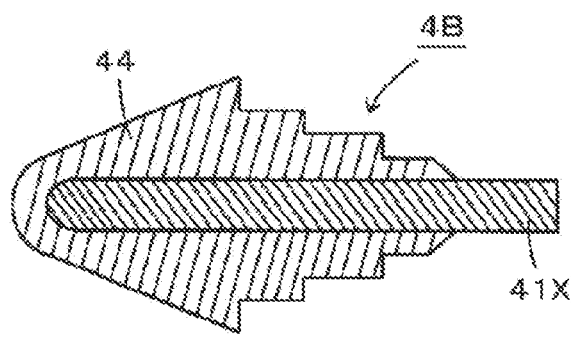
FIG. 4B is a longitudinal cross-sectional view of a stylus tip assembly according to another modification of the present disclosure.

However, the stylus tip assembly 4 is not limited to the structure depicted in FIG. 2A. Rather, the stylus tip assembly 4 may be arranged such that the tip end 41b of the core body 41 does not project from the core body protector 42. FIGS. 4A and 4B are longitudinal cross-sectional views depicting stylus tip assemblies according to modifications, each taken along a plane extending through the central axis thereof. According to each of the modifications, the stylus tip assembly includes a core body and a core body protector, with the core body having a tip end which does not project from the core body protector.

FIG. 4A depicts a stylus tip assembly 4A including a core body 41X which has a tip end covered and protected by a tip member 43 and a portion extending from the tip end and protected by a core body protector 42. The core body 41X is made of the similar material to the core body 41 depicted in FIG. 2A, but has a contour different from the core body 41 depicted in FIGS. 2A, 2B, 3A, and 3B. Specifically, the core body 41X is not shaped as the head of a mushroom at its tip, but has a round tip end.

The tip member 43 has a curved round front surface and serves as a stylus tip. Therefore, the tip member 43 allows the electronic stylus to move smoothly on the touch panel when in use. The tip member 43 prevents the tip end of the core body 41X from being exposed out of the stylus tip assembly 4A, though the tip end of the tip member 43 projects from the core body protector 42 as depicted in FIG. 4A. Therefore, the tip end of the core body 41X is not brought into direct contact with an operating surface of the coordinate detecting sensor (position detecting sensor), and is held protected from wear.

In the stylus tip assembly 4A depicted in FIG. 4A, the core body protector 42 and the tip member 43 may be made of different materials. For example, the core body protector 42 may be made of an insulative material, whereas the tip member 43 may be made of an electrically conductive material. The tip member 43 may alternatively be made of a dielectric material. For example, the core body protector 42 may be made of a material having a low dielectric constant, and the tip member 43 may be made of a material having a high dielectric constant.

Though in the stylus tip assembly 4A depicted in FIG. 4A, the core body protector 42 and the tip member 43 may be made of different materials as described above, the core body protector 42 and the tip member 43 may be made of the same material. FIG. 4B depicts a stylus tip assembly 4B in which the core body protector 42 and the tip member 43 depicted in FIG. 4A are integrally formed of the same material and combined with the core body 41X.

In the stylus tip assembly 4B depicted in FIG. 4B, a core body protector 44 made of an insulative material covers a portion, including a tip end, of the core body 41X so as not to expose the tip end, thereby protecting the core body 41X. Though the core body protector 44 is made of an insulative material, when a signal is sent from the core body 41X, it develops a potential difference due to polarization across the core body protector 44 between an inner side thereof that is held in contact with the core body 41X and an outer side thereof that is spaced from the core body 41X. The potential difference makes it possible to indicate a position pointed by the electronic stylus to a coordinate detecting sensor of the capacitance type which is used in combination with the electronic stylus.

As described above, the electronic stylus 1 may incorporate, as its stylus tip, the stylus tip assembly 4 (see FIG. 2A) in which the tip end 41b of the core body 41 projects from the core body protector 42, or the stylus tip assembly 4A (see FIG. 4A) in which the tip end of the core body 41X is covered with the core body protector 42 and the tip member 43 so as not to be exposed, or the stylus tip assembly 4B (see FIG. 4B) in which the tip end of the core body 41X is covered with the core body protector 44 so as not to be exposed.

With the stylus tip assemblies 4A and 4B depicted in FIGS. 4A and 4B, the positional relationship between the core body protectors 42 and 44 and the core body 41X in the axial directions may be adjusted to select suitable positions for the core body protectors 42 and 44 and the core body 41X. The core body 41X in each of the stylus tip assemblies 4A and 4B depicted in FIGS. 4A and 4B may be replaced with the core body 41 depicted in FIGS. 2A and 2B. In other words, the core body 41X may be of a mushroom shape at its tip as depicted in FIGS. 2A and 2B. Alternatively, the core body 41 may have its tip protected as depicted in FIGS. 4A and 4B. Further alternatively, the tip of the core body may be of any of various other shapes.

[Outline of Coordinate Detecting Sensor of Capacitance Type]

Figure 5:
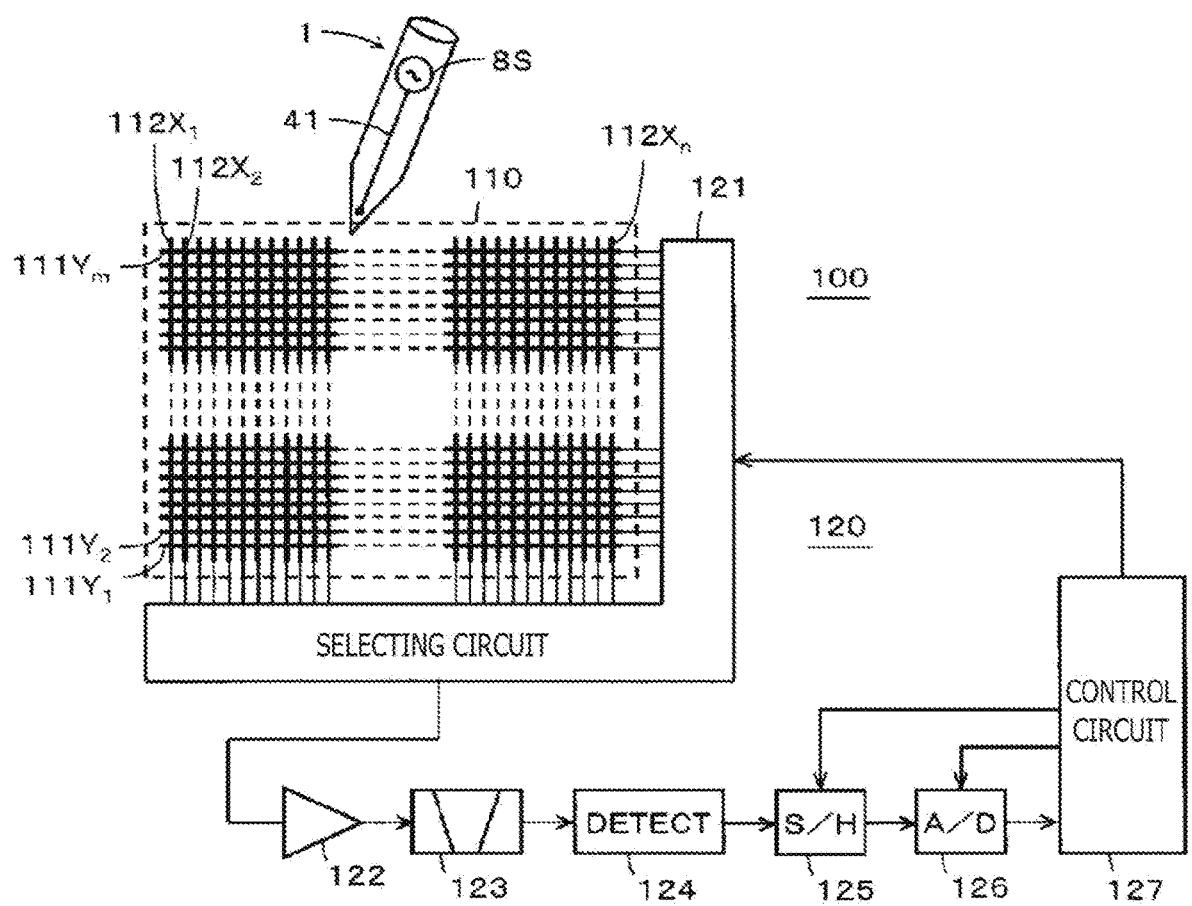
FIG. 5 is a schematic view, partly in block form, of a position detecting device used in combination with the electronic stylus depicted in FIG. 1.

FIG. 5 is a schematic view, partly in block form, of a position detecting device 100 used in combination with the electronic stylus 1 which is of the capacitance type, the position detecting device 100 including a coordinate detecting sensor of the capacitance type for detecting the position of the electronic stylus 1 on the sensor on the basis of a signal sent from the electronic stylus 1 and for detecting a stylus pressure and the state of a side switch to be described later.

As depicted in FIG. 5, the position detecting device 100 includes the coordinate detecting sensor (hereinafter referred to as "sensor") 110 of the capacitance type and a stylus detecting circuit 120 connected to the sensor 110. The sensor 110 has a stack of layers, successively from below, a first conductor group 111, an insulative layer (not depicted), and a second conductor group 112. The first conductor group 111 includes a plurality of first parallel conductors 111Y1, 111Y2, . . . , and 111Ym (m is a positive integer) extending horizontally along an X-axis, for example, and spaced vertically along a Y-axis by predetermined distances. The second conductor group 112 includes a plurality of second parallel conductors 112X1, 112X2, . . . , and 112Xn (n is a positive integer) extending vertically along a Y-axis perpendicular to the X-axis, for example, and spaced horizontally along the X-axis by predetermined distances.

The sensor 110 of the position detecting device 100 thus employs a sensor pattern of the first conductor group 111 and the second conductor group 112 that cross each other for detecting a position indicated by the electronic stylus 1. In the description that follows, in case any of the first conductors 111Y1, 111Y2, . . . , and 111Ym does not need to be distinguished from the others, it will be referred to as "first conductor 111Y." Similarly, in case any of the second conductors 112X1, 112X2, . . . , and 112Xn does not need to be distinguished from the others, it will be referred to as "second conductor 112X."

The stylus detecting circuit 120 includes a selecting circuit 121 serving as an input/output interface with the sensor 110, an amplifying circuit 122, a bandpass filter 123, a detecting circuit 124, a sample and hold circuit 125, an A/D (Analog to Digital) converter circuit 126, and a control circuit 127.

The selecting circuit 121 selects one first conductor 111Y from the first conductor group 111 or one second conductor 112X from the second conductor group 112 according to a control signal from the control circuit 127. The conductor selected by the selecting circuit 121 is connected to the amplifying circuit 122, which amplifies a signal from the electronic stylus 1 that has been detected by the selected conductor. An amplified signal output from the amplifying circuit 122 is supplied to the bandpass filter 123, which extracts only the component of the frequency of the signal from the electronic stylus 1.

An output signal from the bandpass filter 123 is detected by the detecting circuit 124. The detecting circuit 124 supplies its output signal to the sample and hold circuit 125, which samples and holds the supplied signal at a predetermined timing in response to a sampling signal from the control circuit 127. The sampled signal from the sample and hold circuit 125 is converted into a digital signal by the A/D converter circuit 126 according to a control signal from the control circuit 127. Digital data represented by the digital signal from the A/D converter circuit 126 are read and processed by the control circuit 127.

The control circuit 127 is operated according to programs stored in an internal ROM (Read Only Memory) to send control signals to the sample and hold circuit 125, the A/D converter circuit 126, and the selecting circuit 121. The control circuit 127 calculates positional coordinates on the sensor 110 that are indicated by the electronic stylus 1 from the digital data supplied from the A/D converter circuit 126. Furthermore, the control circuit 127 detects a stylus pressure detected by the pressure-sensitive assembly 7 or the stylus pressure detecting module of the electronic stylus 1 and the state of a side switch which includes a pair of pushbuttons 11a and 12a and a pair of push switches 11 and 12 actuatable respectively by the pushbuttons 11a and 12a depicted in FIG. 1.

In the electronic stylus 1 configured as an active capacitive stylus, the signal generating circuit 8S includes an oscillating circuit only, and transmits information of a stylus pressure or turning-on/off of the side switch as an oscillating frequency change to the position detecting device 100.

However, the signal generating circuit 8S is not limited to such a configuration. Instead, the signal generating circuit 8S may include an oscillating circuit and a circuit for modulating an oscillation signal from the oscillating circuit, and may transmit information of a stylus pressure or turning-on/off of the side switch as an ASK (Amplitude Shift Keying) signal to the position detecting device 100.

The electronic stylus 1 according to the present embodiment is suitable for use with the position detecting device 100 which incorporates the coordinate detecting sensor of the capacitance type described above with reference to FIG. 5.

[Modifications of Electronic Stylus 1]

In the electronic stylus 1 described above, the first surfaces a1 and a2 of the core body protector 42 axially face the abutment surfaces A1 and A2, respectively, of the front cap 22, and the second surfaces b1 and b2 of the core body protector 42 radially face the inner wall surfaces B1 and B2, respectively, of the front cap 22. However, the electronic stylus 1 is not limited to such a configuration. Rather, an electronic stylus may have at least one pair of an abutment surface and a first surface, as described below.

Figure 6:
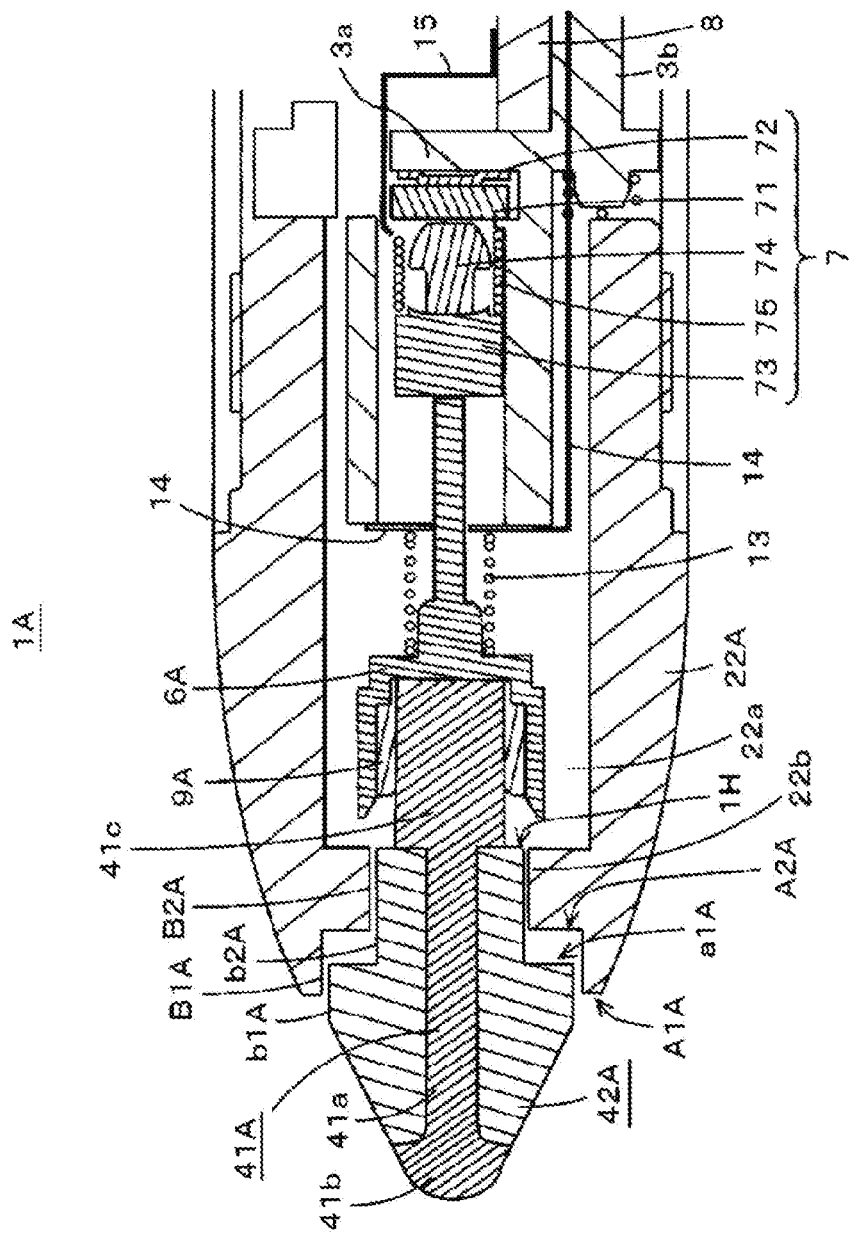
FIG. 6 is an enlarged fragmentary longitudinal cross-sectional view of an electronic stylus according to a modification of the present disclosure.

FIG. 6 is an enlarged fragmentary longitudinal cross-sectional view of an electronic stylus 1A according to a modification. The electronic stylus 1A is essentially of the similar structure to the electronic stylus 1 depicted in FIGS. 1, 2A, and 2B. Those parts of the electronic stylus 1A depicted in FIG. 6 which are similar to those of the electronic stylus 1 depicted in FIGS. 1, 2A, and 2B are denoted by identical reference symbols, and will not be described in detail below. The electronic stylus 1A according to the modification includes a front cap 22A and a core body protector 42A that are different from the front cap 22 and the core body protector 42 of the electronic stylus 1 described above.

As depicted in FIG. 6, the front cap 22A includes a tubular body having an axial through hole 22a defined therein and has a tapered outer profile whose outside diameter is progressively smaller toward the stylus tip on the stylus tip side of the electronic stylus 1A. The front cap 22A has an end surface A1A having a very small area on its tip end and an inner wall surface B1A extending from the radially inner end of the end surface A1A in an axial direction of the front cap 22A, i.e., parallel to the longitudinal central axis thereof.

The front cap 22A further includes an annular ridge 22b protruding radially inwardly from the inner wall surface B1A toward the longitudinal central axis of the front cap 22A. The annular ridge 22b has an abutment surface A2A facing toward the stylus tip side and lying transversely to the longitudinal central axis of the front cap 22A. The annular ridge 22b also has an inner wall surface B2A extending from the radially inner end of the abutment surface A2A in an axial direction of the front cap 22A, i.e., parallel to the longitudinal central axis thereof. Therefore, the front cap 22A has the end surface A1A and the abutment surface A2A disposed in different positions in the axial directions and the directions transverse to the axial directions. The front cap 22A also has therein the two inner wall surfaces B1A and B2A disposed in different positions in the axial directions and the directions transverse to the axial directions.

The core body protector 42A, which protects a core body 41A accommodated therein, has a first surface a1A lying transversely to the longitudinal central axis thereof and facing the abutment surface A2A of the front cap 22A. The core body protector 42A also has a second surface b1A lying parallel to the longitudinal central axis thereof and facing the inner wall surface B1A of the front cap 22A and a second surface b2A lying parallel to the longitudinal central axis thereof and facing the inner wall surface B2A of the front cap 22A.

Between the front cap 22A and the core body protector 42A, therefore, the abutment surface A2A and the first surface a1A that lie transversely to the longitudinal central axis face each other only at one location. However, as can be seen from comparison between FIG. 2A and FIG. 6, the abutment surface A2A and the first surface a1A have wide areas facing each other, which are effective to firmly and reliably prevent the core body 41A and the core body protector 42A from being unduly pushed into the case 2.

Between the front cap 22A and the core body protector 42A, on the other hand, the inner wall surfaces B1A and B2A and the second surfaces b1A and b2A that lie parallel to the longitudinal central axis face each other at two locations. The inner wall surfaces B1A and B2A and the second surfaces b1A and b2A have wider areas facing each other than with the electronic stylus 1 according to the above embodiment regardless of whether the electronic stylus 1A is in use or not. Consequently, even when an excessive load is applied to the core body 41A and the core body protector 42A in a direction transverse to the longitudinal central axis thereof, the inner wall surfaces B1A and B2A and the second surfaces b1A and b2A abut against each other, firmly and reliably preventing the core body 41A from being largely distorted in the direction transverse to the longitudinal central axis thereof thereby to protect the core body 41A against damage.

As depicted in FIG. 6, the core body 41A has an end portion 41c opposite its tip end 41b, extending rearwardly from the main core member 41a and disposed behind the core body protector 42A. The end portion 41c has a diameter larger than the main core member 41a that is covered with and protected by the core body protector 42A. Therefore, the core body protector 42A is axially sandwiched by the tip end 41b and the end portion 41c of the core body 41A, and prevented from being shifted on or dislodged off the core body 41A.

Since the end portion 41c of the core body 41A is larger in diameter than the main core member 41a, a core body holder 6A has a large opening defined therein which is large enough to accommodate the end portion 41c therein, and an electrically conductive elastic member 9A disposed in the core body holder 6A is also large enough to hold the end portion 41c in the core body holder 6A.

The abutment surface A2A of the front cap 22A and the first surface a1A of the core body protector 42A abut against each other before the pressure-sensitive assembly 7 reaches its detection limit point. Consequently, the pressure-sensitive assembly 7 and other parts in the electronic stylus 1A are protected from axial loads applied to the core body 41A.

The main case body 21 and the core body 41A are made of an electrically conductive material, and the core body protector 42A is made of an electrically nonconductive material, so that the electronic stylus 1A has electric connections suitable for carrying out its functions. The core body protector 42A is effective to prevent noises from being transmitted from the main case body 21 to the core body 41A.

[Application to Electronic Stylus for Use with Coordinate Detecting Sensor of Electromagnetic Induction Transfer Type]

As described above, the present disclosure is also applicable to an electronic stylus for use with a coordinate detecting sensor of the electromagnetic induction type. A specific example of electronic stylus according to the present disclosure for use with a coordinate detecting sensor of the electromagnetic induction transfer type will be described below. FIG. 7A is a longitudinal cross-sectional view of an electronic stylus 1B for use in combination with a coordinate detecting sensor of the electromagnetic induction transfer type, taken along a plane extending through the central axis thereof. FIG. 7B is an enlarged fragmentary longitudinal cross-sectional view of the electronic stylus depicted in FIG. 7A. Those parts of the electronic stylus 1B depicted in FIGS. 7A and 7B which are similar to those of the electronic stylus 1 depicted in FIGS. 2A and 2B are denoted by identical reference symbols, and will not be described in detail below.

The electronic stylus 1B serves to indicate a position to a position detecting device 200 (see FIG. 8), to be described later, by way of electromagnetic induction. The electronic stylus 1B has a resonant circuit that resonates with an electromagnetic wave having a particular frequency that is sent from the position detecting device 200. The electronic stylus 1B sends a resonance signal detected by the resonant circuit to the position detecting device 200, thereby indicating a position to the position detecting device 200.

As depicted in FIG. 7A, the electronic stylus 1B includes a main case body 21B representing a specific example of case, a stylus tip assembly 4 made up of a core body 41 and a core body protector 42, a position indicating coil 17, a variable capacitor (stylus pressure detector) or pressure-sensitive assembly 7B, a ferrite core 16, and a printed circuit board 8B.

The main case body 21B is made of an electrically conductive material and formed as an outer shell of the electronic stylus 1B. The main case body 21B is of a bottomed hollow cylindrical shape having one end closed. The main case body 21B includes a first case 22B and a second case 23B that are axially aligned with and coupled to each other. The first case 22B includes a tubular body having an axial through hole 22a defined therein and has a tapered outer profile whose outside diameter is progressively smaller toward the stylus tip on the stylus tip side of the electronic stylus 1B. The first case 22B has an opening 1H defined in its tip end. The first case 22B is open at the other axial end thereof.

The second case 23B includes a tubular body that is open at one axial end and closed at the other axial end. The first case 22B and the second case 23B are disposed coaxially with each other and secured to each other by a fastening unit such as an adhesive, fastening screws, or the like. The printed circuit board 8B with electronic parts installed thereon is mounted in and secured to the second case 23B by a fastening unit such as an adhesive, fastening screws, or the like. The ferrite core 16 is housed in the first case 22B.

The ferrite core 16 is of a tubular shape with an elongate axial hole 16a defined axially therethrough. The core body 41 extends through the elongate axial hole 16a and the tip end 41b of the core body 41 projects from an axial end of the ferrite core 16. The position indicating coil 17, which serves as part of the resonant circuit, is wound around and mounted on the outer circumferential surface of the ferrite core 16. The position indicating coil 17 has both ends, not depicted, electrically connected to electronic parts installed on the printed circuit board 8B. Electronic parts that make up the resonant circuit are mounted on the printed circuit board 8B.

The core body 41 is in the form of an electrically conductive rod-shaped body that is made of a synthetic resin mixed with an electrically conductive material such as metal powder, carbon, or the like. Specifically, the core body 41 includes a rod-shaped main core member 41a and a semi-spherical tip end (stylus tip) 41b mounted on the tip of the main core member 41a. The main core member 41a of the core body 41 of the electronic stylus 1B is longer than the main core member 41a of the core body 41 of the electronic stylus 1 depicted in FIGS. 2A, 2B, 3A, and 3B, because of the ferrite core 16 and the position indicating coil 17 combined therewith. Other structural details of the core body 41 depicted in FIGS. 7A and 7B are the same as those of the core body 41 depicted in FIGS. 2A, 2B, 3A, and 3B.

The core body 41 is housed and extends axially in the main case body 21B. The tip 41b is of a substantially conical shape. The tip 41b of the core body 41 that is housed in the main case body 21B projects out of the opening 1H in the first case 22B. The pressure-sensitive assembly 7B is attached to the axial other end of the main core member 41a which is opposite the tip 41b. The pressure-sensitive assembly 7B is of the similar structure to the pressure-sensitive assembly 7 of the electronic stylus 1 described above.

The main core member 41a includes a portion projecting through the opening 1H out of the stylus tip side of the first case 22B and covered with and protected by the core body protector 42. The tip 41B that is mounted on the tip end of the main core member 41a projects from the core body protector 42. The core body protector 42 is made of an insulative material such as ABS resin, for example. As can be seen from comparison between FIG. 2A and FIG. 7B, the portion of the first case 22B on the stylus tip side and the core body protector 42 are of the similar structure to those depicted in FIG. 2A.

Specifically, as depicted in FIG. 7B, the first case 22B has an end face on the stylus tip side which serves as an abutment surface A1B lying transversely to the axial directions, i.e., the longitudinal central axis, of the first case 22B. The first case 22B also has an inner wall surface B1B extending from the radially inner end of the abutment surface A1B in an axial direction of the first case 22B, i.e., parallel to the longitudinal central axis thereof. The first case 22B further includes an annular ridge 22b protruding radially inwardly from the inner wall surface B1B toward the longitudinal central axis of the first case 22B. The annular ridge 22b has an abutment surface A2B facing toward the stylus tip side and lying transversely to the longitudinal central axis of the first case 22B. The annular ridge 22b also has an inner wall surface B2B extending from the radially inner end of the abutment surface A2B in an axial direction of the first case 22B, i.e., parallel to the longitudinal central axis thereof.

Therefore, as depicted in FIG. 7B, the first case 22B has the two abutment surfaces A1B and A2B disposed in different positions in the axial directions and the directions transverse to the axial directions. The first case 22B also has therein the two inner wall surfaces B1B and B2B disposed in different positions in the axial directions and the directions transverse to the axial directions and surrounding the central axis of the first case 22B.

The core body protector 42 has a first surface a1B lying transversely to the longitudinal central axis thereof and facing the abutment surface A1B of the first case 22B and a first surface a2B lying transversely to the longitudinal central axis thereof and facing the abutment surface A2B of the first case 22B. The core body protector 42 also has a second surface b1B lying parallel to the longitudinal central axis thereof and facing the inner wall surface B1B of the first case 22B and a second surface b2B lying parallel to the longitudinal central axis thereof and facing the inner wall surface B2B of the first case 22B.

The stylus tip assembly 4 that includes the core body 41 and the core body protector 42 as described above is inserted through the opening 1H of the first case 22B on the stylus tip side into the through hole 22a, placing the end portion of the core body 41 in the first case 22B.

As is the case with the electronic stylus 1 described above with reference to FIGS. 2A, 3A, and 3B, even when an excessive load is applied to the core body 41 of the electronic stylus 1B in an axial direction thereof, the installed parts of the electronic stylus 1B, which include the core body 41 and the pressure-sensitive assembly 7B, are protected against damage. Specifically, when an excessive axial load is applied to the core body 41, the abutment surfaces A1B and A2B of the first case 22B and the first surfaces a1B and a2B of the core body protector 42 face each other, preventing the stylus tip assembly 4 made up of the core body 41 and the core body protector 42 from being unduly pushed into the main case body 21B.

Moreover, as is the case with the electronic stylus 1 described above with reference to FIGS. 2A, 3A, and 3B, even when an excessive load is applied to the core body 41 of the electronic stylus 1B in a direction transverse to the axial direction thereof, the installed parts of the electronic stylus 1B, which include the core body 41 and the pressure-sensitive assembly 7B, are protected against damage. Specifically, when an excessive load is applied to the core body 41 in a direction transverse to the central axis of the electronic stylus 1B, the inner wall surfaces B1B and B2B of the first case 22B and the first surfaces b1B and b2B of the core body protector 42 face each other, preventing the stylus tip assembly 4 made up of the core body 41 and the core body protector 42 from being unduly pushed out in the direction transverse to the central axis of the electronic stylus 1B.

As described above, the first case 22B and the core body protector 42 of the electronic stylus 1B for use in combination with a coordinate detecting sensor of the electromagnetic induction transfer type have the similar structural details to those of the electronic stylus 1 depicted in FIGS. 2A, 2B, 3A, and 3B. Consequently, the installed parts including the core body 41 and the pressure-sensitive assembly 7B of the electronic stylus 1B for use in combination with a coordinate detecting sensor of the electromagnetic induction transfer type are appropriately protected from excessive loads applied to the core body 41.

The configurational example depicted in FIGS. 7A and 7B is of a structure similar to the configurational example depicted in FIGS. 2A, 2B, 3A, and 3B, but is not limited to such a structure. The electronic stylus 1B for use in combination with a coordinate detecting sensor of the electromagnetic induction transfer type may be of the structure depicted in FIG. 6.

[Outline of Coordinate Detecting Sensor of Electromagnetic Induction Transfer Type]

Figure 8:
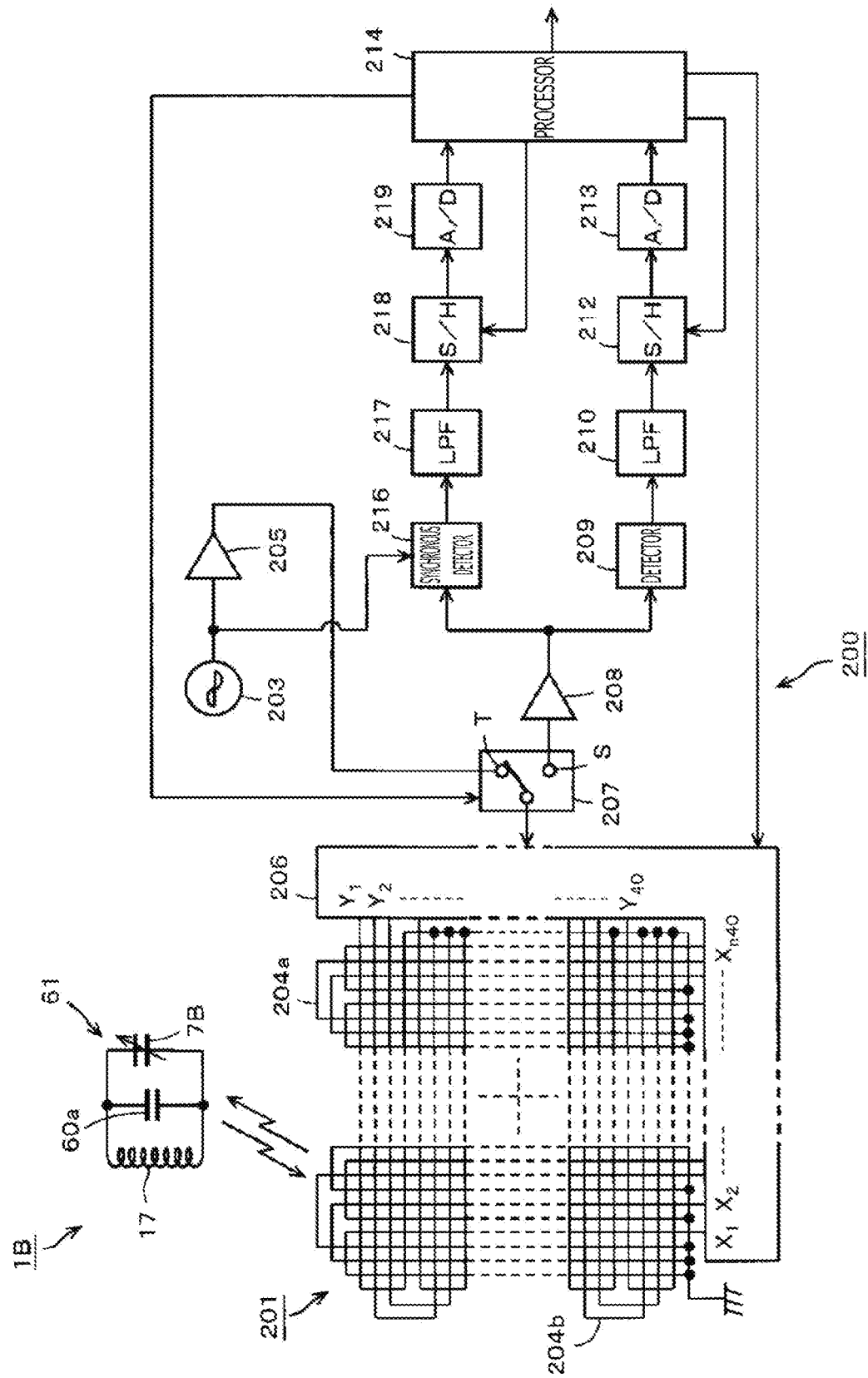
FIG. 8 is a schematic view, partly in block form, of a position detecting device used in combination with the electronic stylus depicted in FIGS. 7A and 7B.

A specific circuit arrangement of a position detecting device 200 of the electromagnetic induction transfer type which detects an indicated position and a stylus pressure using the electronic stylus 1B described above with reference to FIGS. 7A and 7B will be described below with reference to FIG. 8. FIG. 8 is a schematic view, partly in block form, of a circuit arrangement of the electronic stylus 1B and the position detecting device 200. The electronic stylus 1B and the position detecting device 200 jointly make up an input device.

As depicted in FIG. 8, the electronic stylus 1B includes, as a circuit component, a resonant circuit 61 that includes the position indicating coil 17, the variable capacitor (stylus pressure detector) or pressure-sensitive assembly 7B, and a resonant capacitor 60a connected parallel to the variable capacitor 7B.

The position detecting device 200 includes a coordinate detecting sensor 201 of the electromagnetic induction type which has a stack of layers that include an X-axis loop coil group 204a and a Y-axis loop coil group 204b. Each of the loop coil groups 204a and 204b includes 40 rectangular loop coils. In each of the loop coil groups 204a and 204b, the loop coils are successively superposed and spaced at equal intervals.

The position detecting device 200 includes a selecting circuit 206 connected to the X-axis loop coil group 204a and the Y-axis loop coil group 204b. The selecting circuit 206 successively selects one at a time of the loop coils of the two loop coil groups 204a and 204b.

The position detecting device 200 also includes an oscillator 203, a current driver 205, a switching circuit 207, a reception amplifier 208, a detector 209, a low-pass filter 210, a sample and hold circuit 212, an A/D converter circuit 213, a synchronous detector 216, a low-pass filter 217, a sample and hold circuit 218, an A/D converter circuit 219, and a processor 214.

The oscillator 203 generates an AC (Alternating Current) signal having a frequency f0 and supplies the AC signal to the current driver 205 and the synchronous detector 216. The current driver 205 converts the AC signal supplied from the oscillator 203 into a current and sends the current to the switching circuit 207. The switching circuit 207 selects a destination, i.e., a transmission terminal T or a reception terminal S, to which the loop coil selected by the selecting circuit 206 is to be connected, under the control of the processor 214 to be described later. The current driver 205 is connected to the transmission terminal T, and the reception amplifier 208 is connected to the reception terminal S.

A voltage induced across the loop coil selected by the selecting circuit 206 is sent through the selecting circuit 206 and the switching circuit 207 to the reception amplifier 208. The reception amplifier 208 amplifies the induced voltage supplied from the loop coil and sends the amplified voltage to the detector 209 and the synchronous detector 216.

The detector 209 detects the induced voltage from the loop coil, i.e., a reception signal, and sends the detected reception signal to the low-pass filter 210. The low-pass filter 210 has a cutoff frequency sufficiently lower than the frequency f0 referred to above, and converts the output signal from the detector 209 into a DC (Direct Current) signal and sends the DC signal to the sample and hold circuit 212. The sample and hold circuit 212 holds a voltage value of the DC signal output from the low-pass filter 210 at a predetermined timing, i.e., a predetermined timing during a reception period, and sends the held voltage value as an analog output signal to the A/D converter circuit 213. The A/D converter circuit 213 converts the analog output signal from the sample and hold circuit 212 into a digital signal, and outputs the digital signal to the processor 214.

The synchronous detector 216 synchronously detects the output signal from the reception amplifier 208 with the AC signal from the oscillator 203, and sends a signal having a level commensurate with the phase difference between those signals to the low-pass filter 217. The low-pass filter 217 has a cutoff frequency sufficiently lower than the frequency f0 referred to above, and converts the output signal from the synchronous detector 216 into a DC signal and sends the DC signal to the sample and hold circuit 218. The sample and hold circuit 218 holds a voltage value of the DC signal output from the low-pass filter 217 at a predetermined timing, and sends the held voltage value as an analog output signal to the A/D converter circuit 219. The A/D converter circuit 219 converts the analog output signal from the sample and hold circuit 218 into a digital signal, and outputs the digital signal to the processor 214.

The processor 214 controls various components of the position detecting device 200. Specifically, the processor 214 controls the selection of loop coils in the selecting circuit 206, the switching between the destinations of the switching circuit 207, and the timings at which to sample and hold voltage values in the sample and hold circuits 212 and 218. Based on the input signals from the A/D converter circuits 213 and 219, the processor 214 enables the X-axis loop coil group 204a and the Y-axis loop coil group 204b to send electromagnetic waves over constant continuous transmission times.

The loop coils of the X-axis loop coil group 204a and the Y-axis loop coil group 204b induce voltages thereacross in response to an electromagnetic wave sent from the electronic stylus 1B. The processor 214 calculates coordinate values of a position indicated on the X-axis and the Y-axis by the electronic stylus 1B on the basis of the levels of the voltages induced across the loop coils. The processor 214 also detects a stylus pressure based on the phase difference between the transmitted electromagnetic wave and the received electromagnetic wave.

The principles of the present disclosure are thus also applicable to the electronic stylus 1B for use in combination with a coordinate detecting sensor of the electromagnetic induction transfer type. The electronic stylus 1B is suitable for use with the position detecting device that incorporates the coordinate detecting sensor of the electromagnetic induction transfer type described above with reference to FIG. 8. Although the electronic stylus for use in combination with a coordinate detecting sensor of the electromagnetic induction transfer type has been described above, the present disclosure is also applicable to an electronic stylus for use in combination with a coordinate detecting sensor of the electromagnetic induction type, in which the electronic stylus has a signal generating unit and sends signals for detecting a position and a stylus pressure to the coordinate detecting sensor of the electromagnetic induction type.

In the electronic stylus for use with a coordinate detecting sensor of the electromagnetic induction transfer type and the electronic stylus for use with a coordinate detecting sensor of the electromagnetic induction type, the stylus tip assembly made up of the core body and the core body protector may be arranged such that the tip end of the core body does not project from the core body protector. In other words, the stylus tip assembly made up of the core body and the core body protector may be of the structure described above with reference to FIG. 4 in each of the electronic stylus for use with a coordinate detecting sensor of the electromagnetic induction transfer type and the electronic stylus for use with a coordinate detecting sensor of the electromagnetic induction type.

The main case body 21B and the core body 41 may be made of an electrically conductive material, and the core body protector 42 may be made of an electrically nonconductive material, so that the electronic stylus 1B may have electric connections suitable for carrying out its functions. The core body protector 42 is effective to prevent noises from being transmitted from the main case body 21B to the core body 41.

[Modifications]

The stylus tip assembly 4 that includes the core body 41 and the core body protector 42 as depicted in FIGS. 2A and 2B can be integrally formed by a two-color molding (double molding) process which is a technology for integrally molding different substances or materials. The stylus tip assembly 4A made up of the core body 41X, the core body protector 42, and the tip member 43 as depicted in FIG. 4A, and the stylus tip assembly 4B made up of the core body 41X and the core body protector 44 as depicted in FIG. 4B may also be formed by the two-color molding process. The stylus tip assembly made up of the core body 41A and the core body protector 42A as depicted in FIG. 6 may also be formed by the two-color molding process.

In the above embodiment depicted in FIG. 2A, the two abutment surfaces A1 and A2 and the two first surfaces a1 and a2 face each other. However, the front cap 22 may have three or more abutment surfaces and the core body protector 42 may also have three or more corresponding first surfaces. Similarly, the front cap 22 may have three or more inner wall surfaces and the core body protector 42 may also have three or more corresponding second surfaces.

In the above embodiments, each of the pressure-sensitive assemblies 7 and 7B is illustrated as including a variable capacitor, for example. However, the present disclosure is not limited to such a structure. Pressure-sensitive sensors may be fabricated according to the MEMS (Micro Electro Mechanical Systems) technology, and may be used as the pressure-sensitive assemblies 7 and 7B.

It is to be noted that the embodiments of the present disclosure are not limited to the foregoing embodiments, and that various changes can be made without departing from the spirit of the present disclosure.

What is claimed is:

1. An electronic stylus comprising:
    a hollow cylindrical casing having an opening defined in an axial end portion thereof;
    a core body mounted in the casing and having an axial end portion projecting out of the opening; and
    a core body protector covering the axial end portion of the core body, and protecting the core body,
    wherein the casing has, adjacent to the opening, an abutment surface lying in a direction transverse to an axial direction of the casing and an inner wall surface extending in the axial direction of the casing, and
    wherein the core body protector has a first surface facing the abutment surface of the casing and a second surface facing the inner wall surface of the casing.

2. The electronic stylus according to claim 1, wherein the core body has a tip end projecting from the core body protector.

3. The electronic stylus according to claim 1, wherein the core body has a tip end not projecting from the core body protector.

4. The electronic stylus according to claim 1,
    wherein the casing has, adjacent to the opening, a plurality of abutment surfaces lying in the direction transverse to the axial direction of the casing, and
    wherein the core body protector has a plurality of first surfaces, and each of the first surfaces faces a respective one of the abutment surfaces.

5. The electronic stylus according to claim 1,
    wherein the casing has, adjacent to the opening, a plurality of inner wall surfaces in different positions in the axial direction of the casing and the direction transverse to the axial direction of the casing, and
    wherein the core body protector has a plurality of second surfaces, and each of the second surfaces faces a respective one of the inner wall surfaces.

6. The electronic stylus according to claim 1,
wherein the core body protector is made of an electrically nonconductive material,
wherein the core body and the casing are made of an electrically conductive material, and
wherein the core body and the casing are insulated from each other by the core body protector.

7. The electronic stylus according to claim 1, further comprising:
a stylus pressure detector disposed in the casing, wherein the stylus pressure detector, in operation, detects a stylus pressure applied to the core body and transmitted to the stylus pressure detector through the core body when the core body is pushed into the casing,
wherein the abutment surface of the casing and the first surface of the core body protector abut against each other before the stylus pressure detector reaches a detection limit point thereof.

8. The electronic stylus according to claim 1, wherein the core body and the core body protector are integrally formed.

9. The electronic stylus according to claim 1, wherein the core body, the core body protector, and a portion of the casing around the opening have respective output profiles which are contiguous steplessly.

10. The electronic stylus according to claim 1, further comprising:
an oscillating circuit which, in operation, generates and sends a signal through the core body, wherein the signal generated by the oscillating circuit enters information via a position detecting sensor of a capacitance type.

11. The electronic stylus according to claim 1, further comprising:
a resonant circuit which, in operation, receives a signal from a position detecting sensor of an electromagnetic induction transfer type and sends a signal based on the received signal via the core body, wherein the signal sent by the resonant circuit enters information via the position detecting sensor of the electromagnetic induction transfer type.

* * * * *